(12) United States Patent
Sedlmayr et al.

(10) Patent No.: US 11,495,844 B2
(45) Date of Patent: Nov. 8, 2022

(54) CHARGING DEVICE

(71) Applicant: Robert Bosch GmbH, Stuttgart (DE)

(72) Inventors: Andreas Sedlmayr, Pforzheim (DE);
Axel Hubertz, Filderstadt (DE);
Marc-Alexandre Seibert, Stuttgart (DE); Marcin Rejman, Waiblingen (DE); Wolf Zahn, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 193 days.

(21) Appl. No.: 16/970,527

(22) PCT Filed: Mar. 25, 2019

(86) PCT No.: PCT/EP2019/057357
§ 371 (c)(1),
(2) Date: Aug. 17, 2020

(87) PCT Pub. No.: WO2019/185500
PCT Pub. Date: Oct. 3, 2019

(65) Prior Publication Data
US 2020/0411923 A1     Dec. 31, 2020

(30) Foreign Application Priority Data
Mar. 28, 2018   (DE) .......................... 102018204761.8

(51) Int. Cl.
*H02J 7/00*     (2006.01)
*H01M 10/6235*  (2014.01)
(Continued)

(52) U.S. Cl.
CPC ....... *H01M 10/6235* (2015.04); *H01M 10/44* (2013.01); *H01M 10/613* (2015.04);
(Continued)

(58) Field of Classification Search
None
See application file for complete search history.

(56) References Cited

U.S. PATENT DOCUMENTS 6,066,938 A * 5/2000 Hyodo ................. H02J 7/0042
320/114
6,373,228 B1 * 4/2002 Sakakibara ........... H02J 7/0042
320/150

(Continued)

FOREIGN PATENT DOCUMENTS

DE     102004020147 A1   11/2005
DE     102014202547 A1    8/2015
(Continued)

OTHER PUBLICATIONS

International Search Report for PCT/EP2019/057357, dated Jun. 12, 2019.

*Primary Examiner* — Arun C Williams
(74) *Attorney, Agent, or Firm* — Norton Rose Fulbright US LLP; Gerard Messina

(57) ABSTRACT

A charging device for charging an energy accumulator unit, in particular a battery pack, of a hand-held power tool. The charging device includes a cooling device for cooling the energy accumulator unit, in particular the battery pack, a charger housing, which at least in sections forms an outer housing, and a receptacle unit which may detachably accommodate the energy accumulator unit, and is provided to accommodate the energy accumulator unit in a connected state and/or hold it at the charging device. The cooling device is provided to form an airflow directed onto the energy accumulator unit in such a way that the airflow at least in sections flows around the energy accumulator unit.

18 Claims, 3 Drawing Sheets

(51) Int. Cl.
*H01M 10/613* (2014.01)
*H01M 10/6563* (2014.01)
*H01M 10/44* (2006.01)

(52) U.S. Cl.
CPC ....... *H01M 10/6563* (2015.04); *H02J 7/0013* (2013.01); *H02J 7/0045* (2013.01); *H01M 2220/30* (2013.01)

(56) References Cited

U.S. PATENT DOCUMENTS

| | | | | |
|---|---|---|---|---|
| 6,566,005 | B1* | 5/2003 | Shimma | H01M 10/613 429/71 |
| 2002/0034682 | A1* | 3/2002 | Moores, Jr. | H01M 10/482 429/71 |
| 2003/0082439 | A1* | 5/2003 | Sakakibara | H01M 10/6235 429/120 |
| 2003/0090239 | A1* | 5/2003 | Sakakibara | H02J 50/80 320/166 |
| 2007/0236177 | A1* | 10/2007 | Phillips | H01M 50/30 429/82 |
| 2010/0148725 | A1* | 6/2010 | Hirt | H01M 50/209 320/115 |

FOREIGN PATENT DOCUMENTS

| | | | |
|---|---|---|---|
| EP | 0940864 | A2 | 9/1999 |
| EP | 1100173 | A2 | 5/2001 |
| EP | 2849310 | A1 | 3/2015 |
| JP | 2000058138 | A | 2/2000 |
| WO | 2009033865 | A1 | 3/2009 |

\* cited by examiner (RELATED ART)

CHARGING DEVICE

FIELD

The present invention relates to a charging device for charging an energy accumulator of a hand-held power tool.

BACKGROUND INFORMATION

Some conventional charging stations may accommodate a rechargeable battery to cool it. Such charging stations may include a fan, which causes air to flow through the rechargeable battery to cool the rechargeable battery.

SUMMARY

An object of the present invention is to improve a charging device for an energy accumulator, in particular a rechargeable battery, using simple design measures.

The object may be achieved by a charging device in accordance with an example embodiment of the present invention for charging an energy accumulator unit, in particular a battery pack, of a hand-held power tool, including a cooling device for cooling the energy accumulator unit, in particular the battery pack, a charger housing, which at least partially forms an outer housing, and a receptacle unit which may detachably accommodate the energy accumulator unit and which is provided to accommodate the energy accumulator unit and/or hold it at the charging device in a connected state.

According to an example embodiment of the present invention, the cooling device is provided to form an airflow oriented onto the energy accumulator unit in such a way that the airflow flows at least in sections around the energy accumulator unit.

"Flows around" is to be understood in this context in particular as an airflow which flows around the energy accumulator unit or the energy accumulator housing, in particular the outer housing, at least in sections in such a way that the energy accumulator unit is cooled. The energy accumulator unit is in particular to have flow around it from the outside, so that an air circulation around the energy accumulator unit results. In particular, an airflow may flow around the energy accumulator unit in a plane of 360°. The airflow may at least be tangent to the energy accumulator unit or the energy accumulator housing, in particular the outer housing, so that the airflow extends along the energy accumulator unit or along the energy accumulator housing, in particular the outer housing, and cools the energy accumulator unit. The airflow may be guided, for example, along the energy accumulator unit or the charger housing, in particular the outer housing, so that the airflow dissipates heat with the aid of convection.

The cooling device may be provided to enable active cooling of the energy accumulator unit. The cooling device may be provided to have an airflow against the energy accumulator unit, a housing of the energy accumulator unit, directly, in particular from the outside, so that in particular a circumferential surface of the energy accumulator unit at least partially has a flow against it or around it.

It shall be understood that the charging device may be provided for charging more than only one energy accumulator unit. The charging device may be provided to charge the energy accumulator units, which differ, for example, in their dimensions and/or their storage capacities. The charging device may be provided to charge multiple interconnected energy accumulator units.

The example charging device according to the present invention is provided to be connected in a connected state to the energy accumulator unit, in particular in a form-fitting and/or force-fitting manner, for example, to charge and/or cool the energy accumulator unit.

The energy accumulator unit, after a discharge due to, for example, a use of the energy accumulator unit in a hand-held power tool, may thus be cooled faster to the optimum charging temperature provided for charging using the charging device according to the present invention, so that the energy accumulator unit is charged quickly. In particular charging heat generated during a charging process or overheating may be compensated for or prevented, so that a long service life of the energy accumulator unit is ensured.

The charging device is provided to charge the energy accumulator unit or supply it with electrical energy to store this energy in the energy accumulator unit.

The charging device may include an electrical interface. The energy accumulator unit may include an electrical interface which is provided to be connected or coupled to the electrical interface of the charging device to transfer electrical energy from the charging device to the energy accumulator unit. The interfaces may include metallic contact elements for conducting electric current. The energy accumulator unit may be designed as a battery pack. The energy accumulator unit may include a plurality of rechargeable battery cells. The rechargeable battery cells may be designed as electrochemical cells. Lithium cells, lithium-ion cells, or other cells which appear reasonable to those skilled in the art may be used as rechargeable battery cells.

A connected state is to be understood in particular as a state of the charging device in which the energy accumulator unit is connected to the charging device.

The energy accumulator unit may include an energy accumulator housing, which delimits the battery pack. The energy accumulator housing may be provided to enclose and hold the rechargeable battery cells. The energy accumulator housing may be provided to enable passive cooling of the energy accumulator unit. The rechargeable battery cells may thus be sufficiently protected and enable cooling of the rechargeable battery cells.

Further appropriate refinements of the example charging device according to the present invention are described herein.

In accordance with an example embodiment of the present invention, the cooling device may include a fan element, which is provided to form the airflow directed onto the energy accumulator. The airflow may be provided to be guided essentially past the energy accumulator unit. It shall also be understood that the cooling device may include a single one or a plurality of fan elements. The fan elements are designed as cooling elements. It shall be understood that the cooling device may include more than only one cooling element. The airflow may extend from an interior of the charging device to the outside. The airflow may extend, in particular essentially linearly, from the charging device to the energy accumulator unit to flow around the energy accumulator unit. The fan element may be designed as a fan wheel element. The fan wheel element may include multiple fan wheel blades spaced apart from one another in the circumferential direction. The fan element may be situated in the charger housing. The fan element may be enclosed, in particular in a plane of 360°, by the charger housing. The cooling device may be cooled particularly effectively in this way.

The fan element may have an air circulation of greater than 10 m³/h, in particular greater than 15 m³/h, preferably greater than 20 m³/h. The fan element may have an air circulation of less than 40 m³/h, in particular less than 30 m³/h, preferably less than 25 m³/h. In particular, the charging device may include two fan elements, which are situated in particular in a connected state on two sides of the energy accumulator unit facing away from one another, to flow around the energy accumulator unit from two sides. The energy accumulator unit is situated between the two fan elements in a connected state.

In accordance with an example embodiment of the present invention, the airflow be directed essentially onto the energy accumulator unit, in particular the battery pack. An area of the energy accumulator unit may be cooled particularly advantageously in this way.

In accordance with an example embodiment of the present invention, the charging device may have an air outlet opening. The air outlet opening may be provided to orient a flow direction of the airflow. The flow direction may form a flow angle $\alpha$ of at least 5°, in particular at least 10°, preferably at least 15°, preferably at least 20° in relation to a surface normal of the outer housing. The flow direction may form a flow angle $\alpha$ of at most 40°, in particular at most 35°, preferably at most 30°, preferably at most 25° in relation to a surface normal of the outer housing. An optimum incident flow of the energy accumulator unit may be achieved in this way even if different energy accumulator units are used.

The charger housing, in particular the outer housing, may include an air inlet opening and an air outlet opening. The charger housing may include a single one or a plurality of air inlet openings. The charger housing may include a single one or a plurality of air outlet openings. The openings (air inlet opening, air outlet opening) may be formed as breakthroughs in the material which open a/the charger housing from an outside to an inside. The material breakthrough is provided to enable an airflow of ambient air from external surroundings through the material breakthrough (air inlet opening) into the interior of the charging device. The material breakthrough (air outlet opening) is provided to enable an airflow of ambient air from an interior of the charging device through the material breakthrough to external surroundings. An airflow is to represent a directed flow of air, which is provided in particular to guide ambient air through the charging device to flow around the energy accumulator unit. Directed flow is to be understood in particular as an essentially linear flow. The air inlet opening may be situated on the side of the charger housing opposite to the air outlet openings.

The cooling device is provided to form an airflow from the air inlet opening to the air outlet opening.

The cooling device may form a directed airflow in such a way that the air inlet opening has an entry airflow and the air outlet opening has an exit airflow.

In accordance with an example embodiment of the present invention, the airflow may flow out of the charging device to cool the energy accumulator unit, in particular the battery pack. The airflow may extend from the fan element to the energy accumulator unit to cool the energy accumulator unit. The airflow may flow through the air outlet opening to cool the energy accumulator unit. The energy accumulator may have a flow connection to the fan element. Cooling of the energy accumulator unit may thus be enabled in a particularly simple way.

It may furthermore be provided, in accordance with an example embodiment of the present invention, for the charging device to have a guide recess, which is provided to guide the airflow from the fan element to the air outlet opening.

The guide recess may be formed as a guide channel. The guide recess may be provided to guide the airflow in such a way that the airflow flows out of the charging device at the flow angle. The guide recess may be curved at least in sections. The guide recess may be enclosed by the charging device. The guide recess may narrow in a direction facing away from the air outlet opening to concentrate the airflow. The guide recess may be formed as an air guide recess.

It may furthermore be provided, in accordance with an example embodiment of the present invention, that the charging device is provided to charge the energy accumulator unit, in particular the battery pack, in a charging state and cool it with the aid of the cooling device. The cooling device may be provided to be activated during a charging process to enable cooling during the charging process.

The cooling device may be provided to cool the energy accumulator unit during a charging process. Alternatively or additionally, the cooling device may be provided to cool the energy accumulator unit independently of a charging process. For example, the charging device may be provided in a connected state to cool the energy accumulator unit and to begin a charging procedure, for example, if the temperature falls below an average limiting temperature of the energy accumulator unit of, for example, 45° C. The charging process may be appropriately interrupted if the energy accumulator unit reaches an average temperature which exceeds approximately 50° C. Such temperatures may occur in energy accumulator units having rechargeable battery cells or electrochemical cells which store electrical energy on the basis of lithium compounds. An average temperature is to be understood as a temperature which is present in the interior and/or on an outer area of the energy accumulator unit and in particular deduces the actual temperature of the energy accumulator unit or the rechargeable battery cells. The energy accumulator unit may be designed, for example, as a lithium-ion energy accumulator unit. The energy accumulator unit may thus be charged in a particularly conserving manner.

The energy accumulator unit, in particular the battery pack, may include multiple rechargeable battery cells which are connected with the aid of a cell connector. The cell connector may be provided to absorb and dissipate heat from the rechargeable battery cells.

It shall be understood that the energy accumulator unit may include a single one or a plurality of cell connectors. It is furthermore provided that a/the cell connector is situated in/at a side wall of the energy accumulator housing. The energy accumulator unit, in particular the battery pack, may be situated in a charging state on the charging device in such a way that the airflow flows against or around the side wall of the energy accumulator housing. In particular, the airflow is to flow against the side wall of the energy accumulator housing which includes a cell connector.

The cell connector may be provided to electrically connect two adjacent rechargeable battery cells. The cell connector may be designed as a heat conductor element. The cell connector may be made up of a metal, in particular of a copper material. The cell connector may delimit an extension of the rechargeable battery cells. The heat conductor element is to be understood as an element having a heat conductor coefficient of greater than 1 W/mK, in particular greater than 10 W/mK, preferably greater than 100 W/mK, particularly preferably greater than 1000 W/mK. The cell connector may be provided to absorb and dissipate thermal energy of the energy accumulator unit or the rechargeable battery cells to cool the energy accumulator unit. The cell connector may adjoin the energy accumulator housing, in particular the side wall. The cell connector may be connected to the energy accumulator housing. The cell connector may be situated at a heat conductor element of the energy accumulator housing, in particular the side wall. The heat conductor element may be designed as a heat conductor wall of the energy accumulator housing. The side wall may be designed as a heat conductor wall. The heat conductor element or the heat conductor wall of the energy accumulator housing may include a heat conductor surface. The heat conductor element or the heat conductor wall may be formed from a plastic material. The heat conductor surface may be situated on an outside of the energy accumulator housing. The cell connector may be situated at a side of the energy accumulator housing facing away from the heat conductor surface. Alternatively or additionally, the cell connector may be extrusion coated at least in sections by the heat conductor wall of the energy accumulator housing. The heat conductor surface may delimit the energy accumulator unit or an extension of the energy accumulator unit. Targeted cooling with the aid of a heat conductor surface may be enabled in this way.

In particular, the energy accumulator may be aligned on the charging device in such a way that the airflow of the cooling device flows against and/or around the heat conductor wall of the energy accumulator.

It is furthermore provided that the air outlet opening is provided to orient the flow direction, in particular the flow angle of the flow direction, of the airflow as a function of the energy accumulator unit used, in particular the battery pack. The air outlet opening may be formed by an air outlet element. The air outlet element may be movably supported in the charger housing of the charging device.

The present invention furthermore relates to a system including a charging device including an energy accumulator unit, in particular a battery pack. The energy accumulator unit includes a coding device, which is provided with a coding device of the charging device to orient an air outlet opening in such a way that a flow orientation, in particular a flow angle of the flow direction, of an airflow is changed as a function of the energy accumulator unit.

BRIEF DESCRIPTION OF THE DRAWINGS

Further advantages result from the following description of the figures. Exemplary embodiments of the present invention are shown in the figures. The figure and the description herein contain numerous features in combination. Those skilled in the art will also appropriately consider the features individually and combine them to form reasonable further combinations, based, for example on the description herein.

BRIEF DESCRIPTION OF THE DRAWINGS

Figure 1:
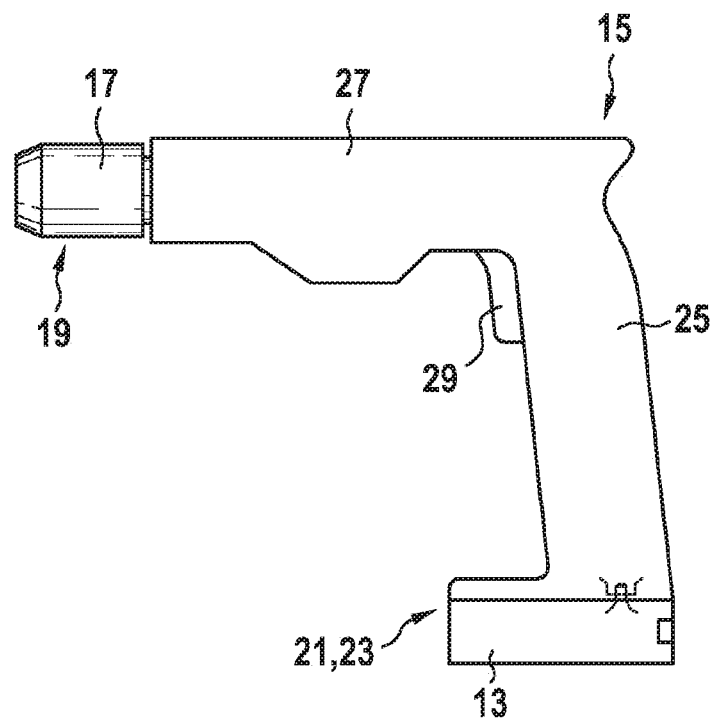
Figure 2:
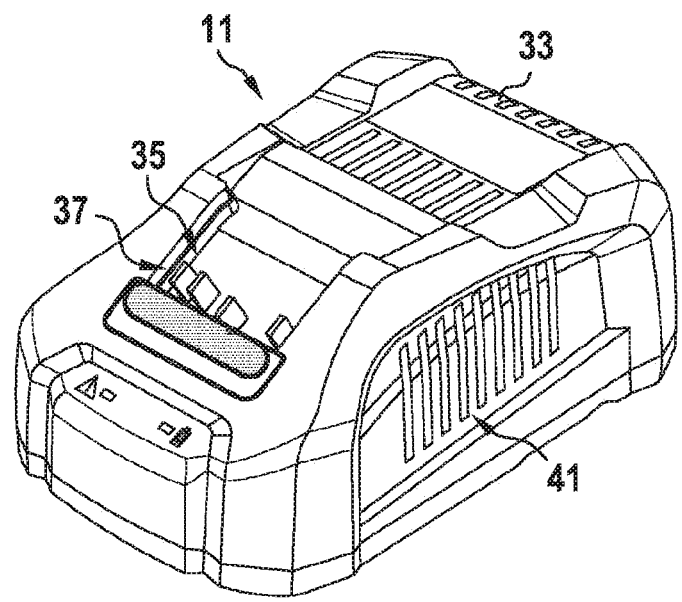

FIG. 1 shows a perspective view of a hand-held power tool including an energy accumulator unit FIG. 2 shows a perspective view of a charging device according to the related art.

Figure 3:
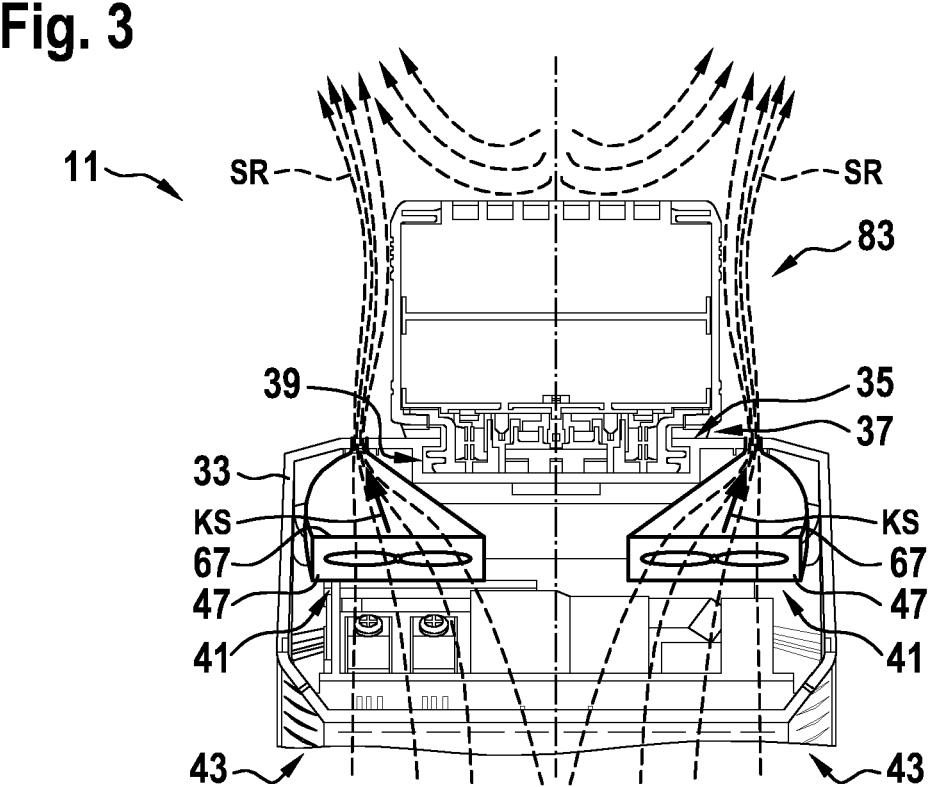

FIG. 3 shows a schematic view of a first specific embodiment of a charging device in accordance with the present invention.

Figure 4:
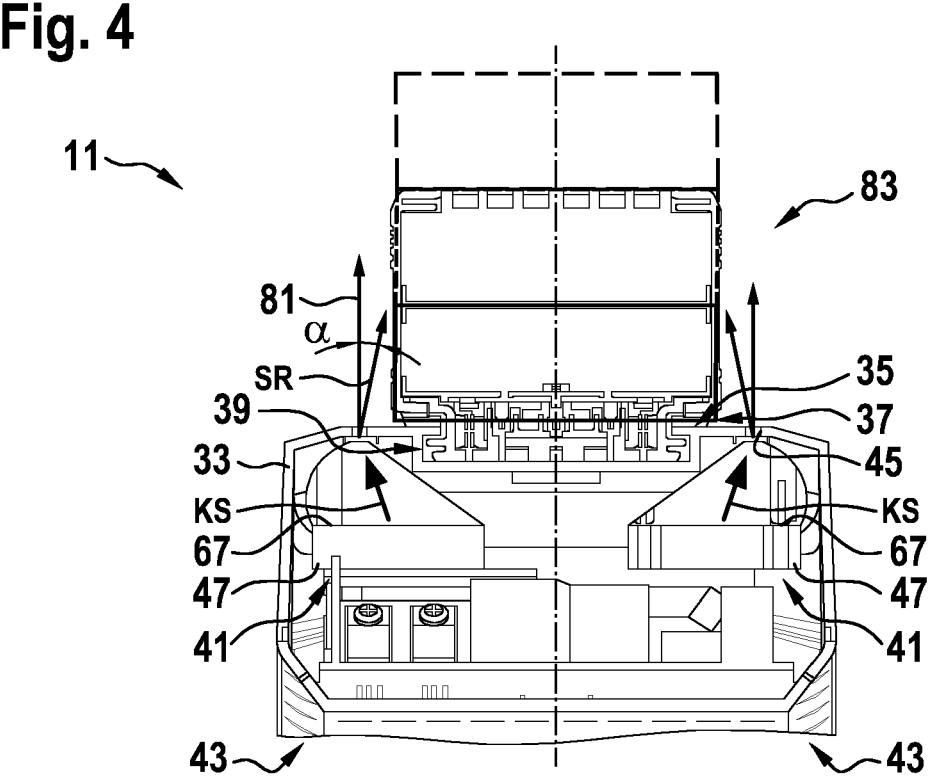

FIG. 4 shows a further schematic view of the first specific embodiment from FIG. 3, in accordance with the present invention.

Figure 5A:
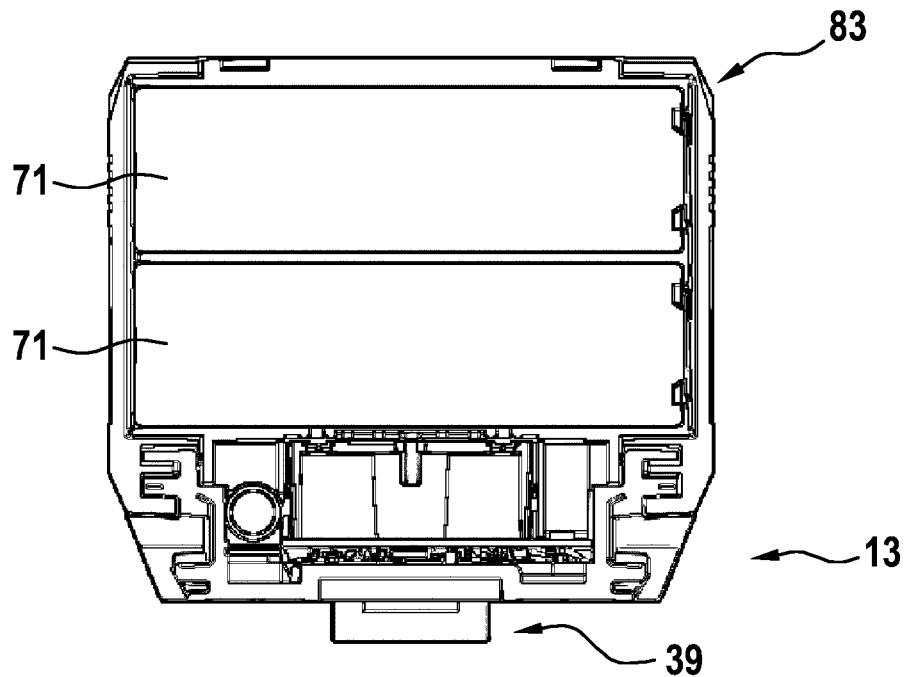
Figure 5B:
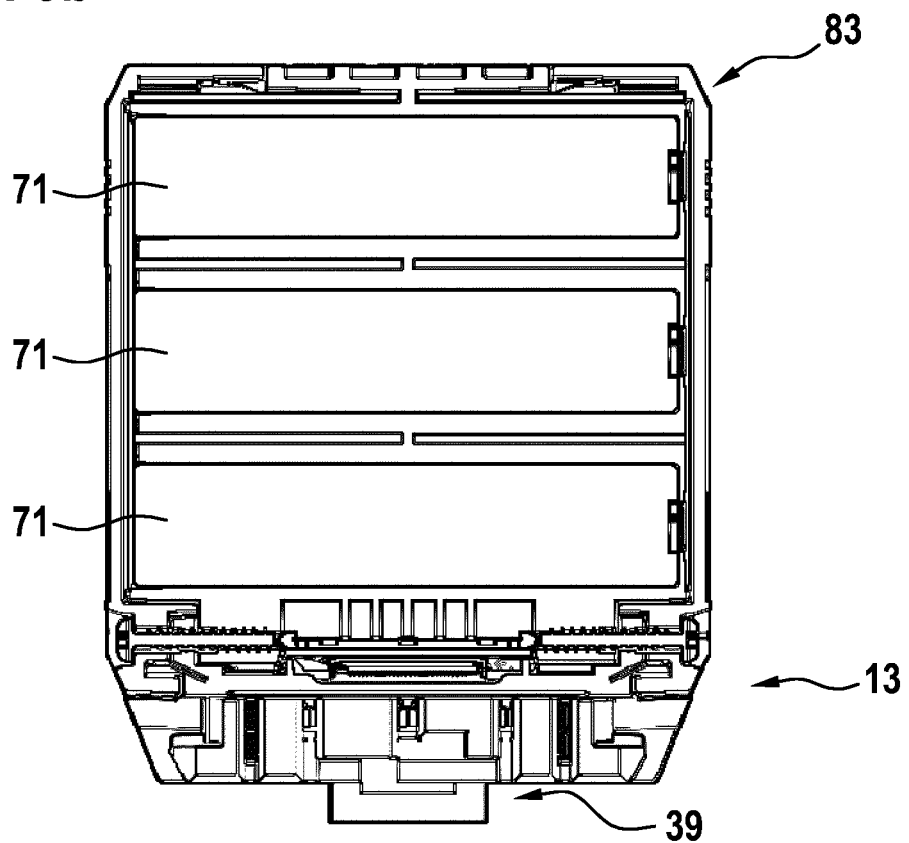

FIGS. 5a, 5b show a cross-sectional view of two energy accumulator units, in accordance with the present invention.

DETAILED DESCRIPTION OF EXAMPLE EMBODIMENTS

In the figures, identical components are provided with identical reference numerals.

The figures each relate to a charging device 11 for an energy accumulator unit 13 designed as a battery pack 13. Battery pack 13 is provided to supply a hand-held power tool 15 with electrical energy. Hand-held power tool 15 is designed, for example, as a rotary impact screwdriver or a drill (FIG. 1). In an alternative specific embodiment, hand-held power tool 15 may also be designed as another hand-held power tool 15 which appears reasonable to those skilled in the art, for example, an angle grinder.

Hand-held power tool 15 includes a tool receptacle unit 17 for accommodating insert tools (not shown), for example, screwdriver bits for screwing screws or drills for drilling holes in a workpiece. Tool receptacle unit 17 includes a conventional clamping device 19, which is provided to hold an insert tool in hand-held power tool 15. Hand-held power tool 15 includes a rechargeable battery receptacle unit 21 including a holding unit 23 for detachably accommodating a battery pack 13. Holding unit 23 is provided to hold battery pack 13 in a fastening state connected to hand-held power tool 15. Hand-held power tool 15 is designed as a battery-operated hand-held power tool 15.

FIG. 1 shows hand-held power tool 15 including a drive unit (not shown) for transferring a working movement to an insert tool. Hand-held power tool 15 includes a charger housing 25 designed as a handle housing 25, which forms an outer housing 27 of hand-held power tool 15 and is provided to be gripped by a hand of an operator of hand-held power tool 15. Hand-held power tool 15 includes an actuating element 29 for switching on and off the drive unit (not shown) with the aid of an on/off switch (not shown) and a transmission unit (not shown) designed as a planetary gear.

FIG. 2 shows a charging device 11 according to the related art. Charging device 11 includes a cooling unit 31 designed as an air cooler, which is provided to cool battery pack 13.

FIG. 3 and FIG. 4 show a first specific embodiment of charging device 11 according to the present invention (FIG. 3) and a second specific embodiment of charging device 11 according to the present invention (FIG. 4). Charging device 11 is designed for charging and cooling an energy accumulator unit 13, designed as a battery pack 13, of a hand-held power tool 15. Battery pack 13 includes multiple rechargeable battery cells 71. Furthermore, lithium-ion cells are used as rechargeable battery cells 71, which are connected to form a parallel circuit and form a rechargeable battery cell block. Rechargeable battery cells 71 are identically constructed and dimensioned. Rechargeable battery cells 71 are designed as lithium-ion cells.

Charging device 11 furthermore includes a charger housing 33, which at least in sections forms an outer housing and delimits charging device 11.

Charging device 11 furthermore includes a receptacle unit 35, which may detachably accommodate battery pack 13. Receptacle unit 35 is provided to accommodate battery pack 13 in a connected state and hold it at charging device 11. The energy accumulator unit is delimited by an energy accumulator housing designed as a battery pack housing 83.

Charging device 11 moreover includes a cooling device 41 for cooling battery pack 13. Cooling device 41 is provided to form an airflow KS directed onto the energy accumulator unit. Airflow KS flows at least partially around the energy accumulator unit. Airflow KS generates an air circulation around battery pack housing 83 of battery pack 13 to cool battery pack housing 83. An airflow KS may flow around battery pack 13 in a plane of 360°. Airflow KS is tangent to battery pack housing 83, so that airflow KS extends along battery pack housing 83 to cool battery pack 13 with the aid of convection.

Cooling device 41 is provided to enable active cooling of battery pack 13, whereby airflow KS flows directly against battery pack 13 (FIG. 3).

Charging device 11 according to the example embodiment of the present invention is provided to be connected in a form-fitting manner to battery pack 13 in a connected state to charge and cool the energy accumulator unit. Battery pack 13 stores electrical energy during a charging procedure.

Charging device 11 includes an electrical interface 37 which is connected or coupled to an electrical interface 37 of battery pack 13 in a connected state to transfer electrical energy from charging device 11 to battery pack 13. Interfaces 37, 39 include metallic contact elements for conducting the electric current.

Cooling device 41 is provided to be activated during a charging process to enable cooling of battery pack 13 during the charging process. Cooling device 41 includes two fan elements 47 designed as cooling elements, which are each provided to form an airflow KS directed onto the battery pack. Airflows KS are provided to flow past battery pack 13 on two sides and to flow against battery pack 13 at the same time. The two fan elements 47 are situated in a connected state on two sides of battery pack 13 facing away from one another, for a flow around battery pack 13 at two sides. Battery pack 13 is situated in a connected state between the two fan elements 47. Airflow KS extends from an interior of charging device 11 to the outside and flows around battery pack 13 on two opposing sides of battery pack 13. The airflows extend essentially linearly, after the airflows flow out of charging device 11, so that the airflows extend essentially linearly from charging device 11 to battery pack 13. Fan elements 47 are designed as fan wheel elements and each include multiple fan wheel blades spaced apart from one another in the circumferential direction. Fan elements 47 are situated in charger housing 33 and enclosed thereby. Fan elements 47 are enclosed by charger housing 33 in a plane of 360°.

Airflows KS are directed essentially onto battery pack 13 and are incident on battery pack 13 approximately at an angle α of 20° in relation to battery pack housing 83, in particular a battery pack surface. Airflows KS are redirected by battery pack 13 to dissipate heat from battery pack housing 83. Airflows KS extend at least from fan element 47 to battery pack 13 to cool battery pack 13. Airflows KS flow through air outlet opening 45 to cool battery pack 13. Battery pack 13 has a flow connection to fan elements 47.

Charging device 11 includes two air outlet openings 45. Air outlet openings 45 are provided to orient a flow direction SR of airflow KS. The flow directions form a flow angle α of approximately 20° in relation to a surface normal 81 of charger housing 33.

Charger housing 33 includes multiple air outlet openings 45. The openings (air inlet opening 43, air outlet opening 45) are formed as material breakthroughs which open charger housing 33 in sections from an outside to an inside. The material breakthroughs are used to guide ambient air through charger housing 33 and to form airflows, which are oriented on battery pack 13 with the aid of air outlet openings 45. Fan elements 47 form the airflows from air inlet opening 43 to air outlet opening 45. Air inlet openings 43 are situated at a side of charger housing 33 opposite to air outlet openings 45. Air inlet openings 43 are formed as slots in the battery pack housing.

Rechargeable battery cells 71 are electrically connected with the aid of multiple cell connectors. The cell connectors are furthermore provided to absorb and dissipate heat from rechargeable battery cells 71. The cell connectors. are situated at side walls of battery pack 13. Battery pack 13 is situated in a charging state on charging device 11 or receptacle unit 35 in such a way that the airflows flow against or around the side walls of battery pack 13 in which the cell connectors. are situated. Battery pack 13 is provided to enable and improve passive cooling of battery pack 13 or the side walls.

The cell connectors are designed as heat conductor elements. The cell connectors are made up of a copper material. The cell connectors delimit an extension of rechargeable battery cells 71. The cell connectors are provided to absorb thermal energy of rechargeable battery cells 71 and dissipate it to the side walls to passively cool battery pack 13. The cell connectors adjoin the side wall. The cell connectors may be connected to battery pack housing 83, for example, in that the cell connectors/one of the cell connectors is/are at least partially extrusion coated by battery pack housing 83 or the side wall. The cell connectors are situated on a heat conductor element of the side wall. The heat conductor element is designed as a heat conductor wall of battery pack 13. The side wall against which airflow KS flows is formed as a heat conductor wall. The heat conductor element or the heat conductor wall of battery pack 13 may include a heat conductor surface. The heat conductor element or the heat conductor wall is formed from a plastic material. The heat conductor surface is situated at an outside of battery pack 13. The cell connector is situated at a side of battery pack 13 facing away from the heat conductor surface.

Airflow KS is oriented on the heat conductor wall of battery pack 13 at which the cell connectors are situated. Heat may be dissipated in a particularly simple manner in this way.

Air outlet opening 45 is provided to orient flow angle α of flow direction SR of airflow KS as a function of employed battery pack 13. Air outlet opening 45 is formed by an air outlet element which is movably supported in charger housing 33 of charging device 11.

Charging device 11 has a guide recess 67 associated with a fan element 47, which is provided to guide airflow KS from fan element 47 to air outlet element or air outlet opening 45. Guide recess 67 is formed as a guide channel and is provided to guide airflow KS to orient airflow KS at flow angle α. Guide recess 67 is formed to be curved. The guide channel is enclosed by charger housing 33. The guide channel narrows in a direction facing toward air outlet opening 45 to concentrate airflow KS.

In an alternative specific embodiment, charging device 11 may include a coding device (not shown) including a coding element, which is provided with a coding device and a corresponding coding element of battery pack 13 to align air outlet opening 45 in such a way that flow angle α of flow direction SR of airflow KS is changed as a function of employed battery pack 13.

Charging device 11 may be provided to charge battery pack 13, which differs, for example, in its dimensions and/or its storage capacities.

What is claimed is:

1. A charging device for charging an energy accumulator unit of a hand-held power tool, comprising:
   a cooling device to cool the energy accumulator unit;
   a charger housing which at least in sections forms an outer housing; and a receptacle unit to detachably accommodate the energy accumulator unit and which is configured to accommodate the energy accumulator unit in a connected state and/or hold it at the charging device;

wherein the cooling device is configured to form an airflow directed onto the energy accumulator unit so that the airflow at least in sections flows around the energy accumulator unit, wherein an air outlet opening is provided to orient a flow angle of a flow direction of the airflow as a function of the energy accumulator unit, wherein the air outlet opening is formed by an air outlet element which is movably supported in the charger housing, wherein the charging device includes a guide recess associated with a fan element, which is provided to guide the airflow from the fan element to the air outlet element or the air outlet opening, and wherein the guide recess is formed as a guide channel and is provided to guide the airflow to orient the airflow at the flow angle, wherein the guide recess is formed to be curved, wherein the guide channel is enclosed by the charger housing, and wherein the guide channel narrows in a direction facing toward the air outlet opening to concentrate the airflow.

2. The charging device as recited in claim 1, wherein the energy accumulator unit includes a battery pack.

3. The charging device as recited in claim 1, wherein the cooling device includes the fan element to produce the airflow directed onto the energy accumulator, the airflow being guided past the energy accumulator unit.

4. The charging device as recited in claim 1, wherein the airflow is directed onto the energy accumulator unit.

5. The charging device as recited in claim 1, wherein the charging device includes the air outlet opening to orient the flow direction of the airflow, the flow direction forming a flow angle of at least 5°, in relation to a surface normal of the outer housing.

6. The charging device as cited in claim 5, wherein the flow angle is:
(i) at least 10° or at least 15° or at least 20°, and/or (ii) at most 40°, or at most 35°, or at most 30°, or at most 25°, in relation to the surface normal of the outer housing.

7. The charging device as recited in claim 1, wherein the airflow is guided to flow out of the charging device to cool the energy accumulator unit.

8. The charging device as recited in claim 5, wherein the charging device includes the guide recess to guide the airflow from the fan element to the air outlet opening.

9. The charging device as recited in claim 1, wherein the charging device is configured to charge the energy accumulator unit in a connected state and to cool the energy accumulator unit using the cooling device.

10. The charging device as recited in claim 1, wherein the energy accumulator unit includes multiple rechargeable battery cells which are connected using a cell connector.

11. The charging device as recited in claim 10, wherein the cell connector is situated in or at a side wall of the outer housing, the energy accumulator unit being situated in a charging state on the charging device so that the airflow flows against the side wall of the charging device.

12. The charging device as recited in claim 5, wherein the air outlet opening is configured to orient the flow angle of the flow direction of the airflow as a function of the energy accumulator unit.

13. A system, comprising:
a charging device including:
a cooling device to cool the energy accumulator unit;
a charger housing which at least in sections forms an outer housing; and
a receptacle unit to detachably accommodate the energy accumulator unit and which is configured to accommodate the energy accumulator unit in a connected state and/or hold it at the charging device;
wherein the cooling device is configured to form an airflow directed onto the energy accumulator unit so that the airflow at least in sections flows around the energy accumulator unit; and
an energy accumulator unit including a coding device, which is configured to, with a coding device of the charging device, align an air outlet opening so that a flow direction the airflow is changed as a function of the energy accumulator unit,
wherein the air outlet opening is configured to orient a flow angle of the flow direction of an airflow as a function of the energy accumulator unit, wherein the air outlet opening is formed by an air outlet element which is movably supported in the charger housing,
wherein the charging device includes a guide recess associated with a fan element, which is provided to guide the airflow from the fan element to the air outlet element or the air outlet opening, and
wherein the guide recess is formed as a guide channel and is provided to guide the airflow to orient the airflow at the flow angle, wherein the guide recess is formed to be curved, wherein the guide channel is enclosed by the charger housing, and wherein the guide channel narrows in a direction facing toward the air outlet opening to concentrate the airflow.

14. The system as recited in claim 13, wherein the energy accumulator unit includes a battery pack.

15. A charging device for charging an energy accumulator unit of a hand-held power tool, comprising:
a cooling device to cool the energy accumulator unit;
a charger housing which at least in sections forms an outer housing; and
a receptacle unit to detachably accommodate the energy accumulator unit, and which is configured to accommodate the energy accumulator unit in a connected state and/or hold it at the charging device;
wherein the cooling device is configured to form an airflow directed onto an outer side of a battery pack housing of the energy accumulator unit so that the airflow is reflected by the battery pack housing and at least in sections flows around the energy accumulator unit without entering the battery pack housing.

16. The charging device as recited in claim 15, wherein the cooling device includes two fan elements, which function as cooling elements, each of which is provided to form an airflow directed onto two opposite sides of the battery pack housing.

17. The charging device as recited in claim 16, wherein the charger housing includes at least one air outlet opening that is spaced apart from the receptacle unit.

18. The charging device as recited in claim 15, wherein the charger housing includes at least one air outlet opening that is spaced apart from the receptacle unit.

* * * * *